5 Sheets—Sheet 1.
J. W. HYATT.
Manufacture of Sheets of Celluloid and other Plastic Compositions.
No. 199,908. Patented Feb. 5, 1878.
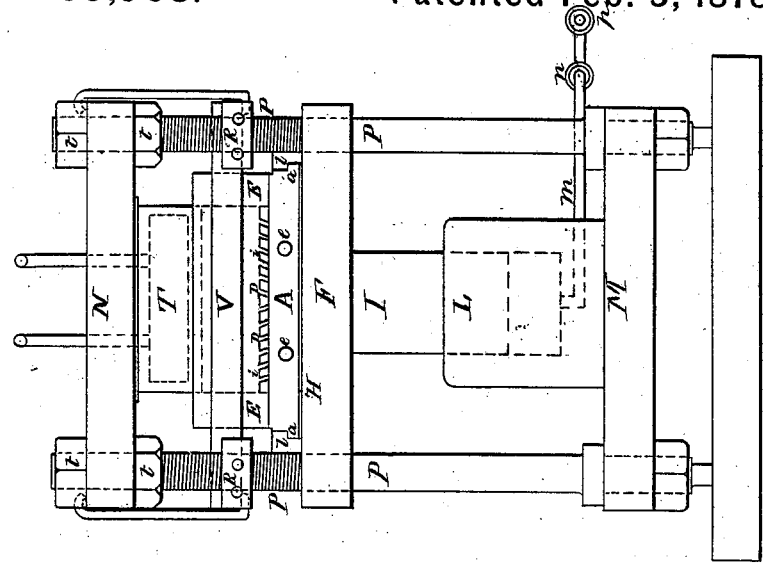
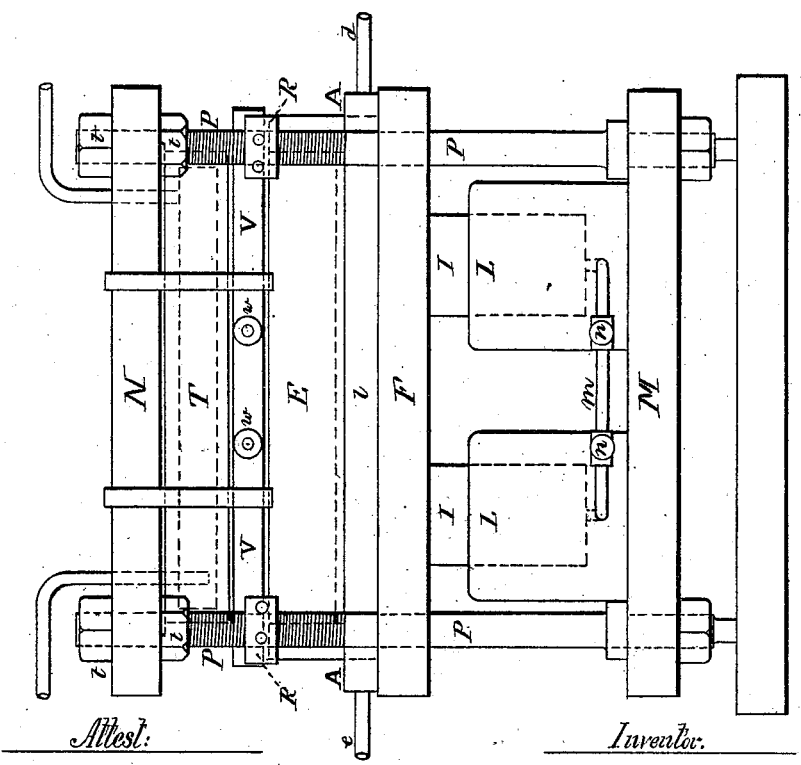
Attest:
Chas. F. Gill
F. Walter Fowler
Inventor:
John W. Hyatt
by his attorneys Cox & Cox 5 Sheets—Sheet 2.
J. W. HYATT.
Manufacture of Sheets of Celluloid and other Plastic Compositions.
No. 199,908. Patented Feb. 5, 1878.
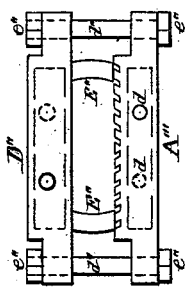
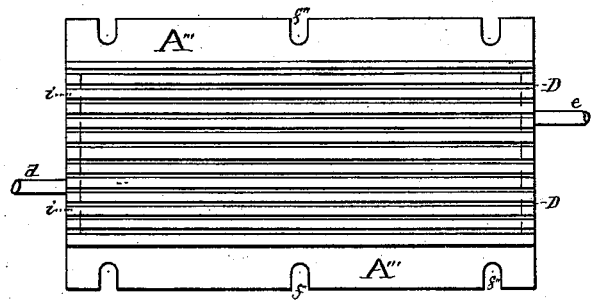
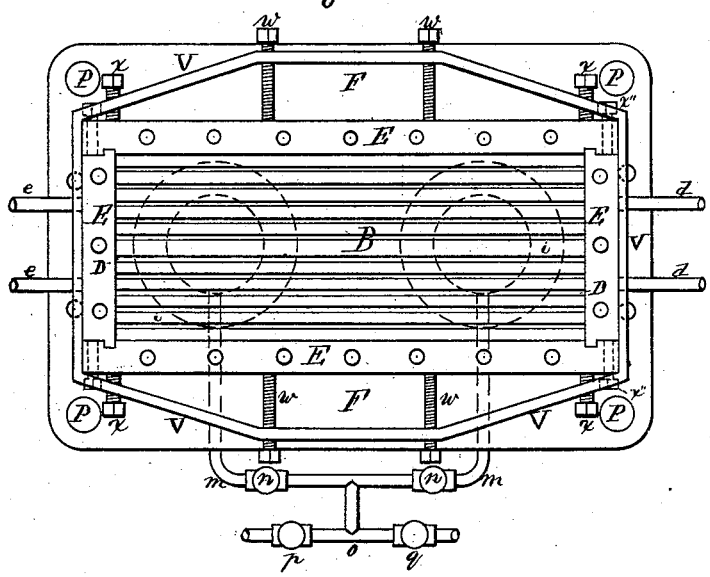
Attest:
Chas. C. Gill
T. Walter Fowler
Inventor.
John W. Hyatt
by his attorney Cox & Cox 5 Sheets—Sheet 3.
J. W. HYATT.
Manufacture of Sheets of Celluloid and other Plastic Compositions.
No. 199,908. Patented Feb. 5, 1878.
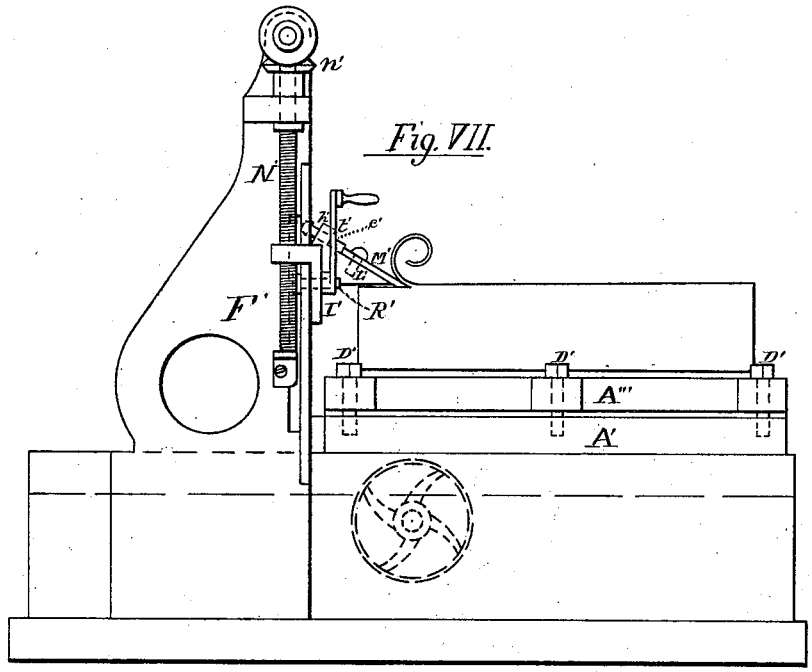
Fig. VII.
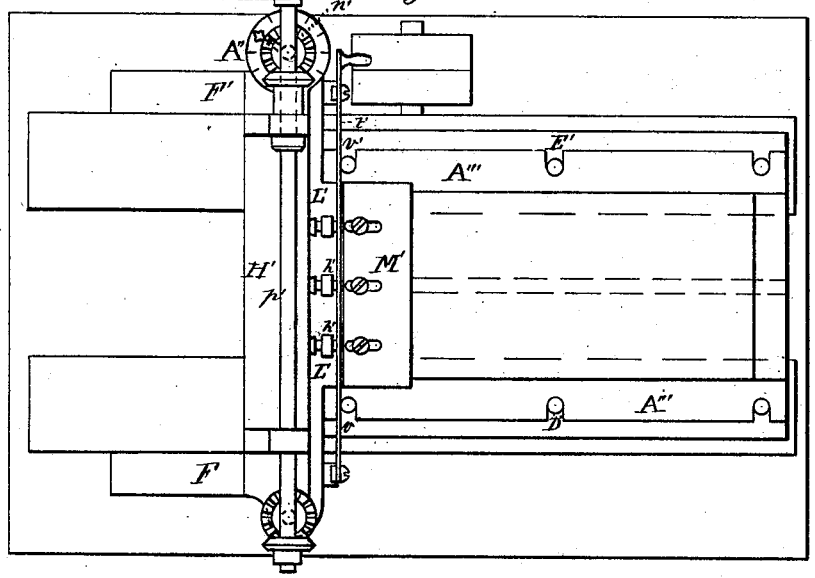
Fig. VI.
Attest:
Chas. C. Gill
J. Walter Fowler
Inventor:
John W. Hyatt
by his attorney Cox & Cox 5 Sheets—Sheet 4.
J. W. HYATT.
Manufacture of Sheets of Celluloid and other Plastic Compositions.
No. 199,908. Patented Feb. 5, 1878.
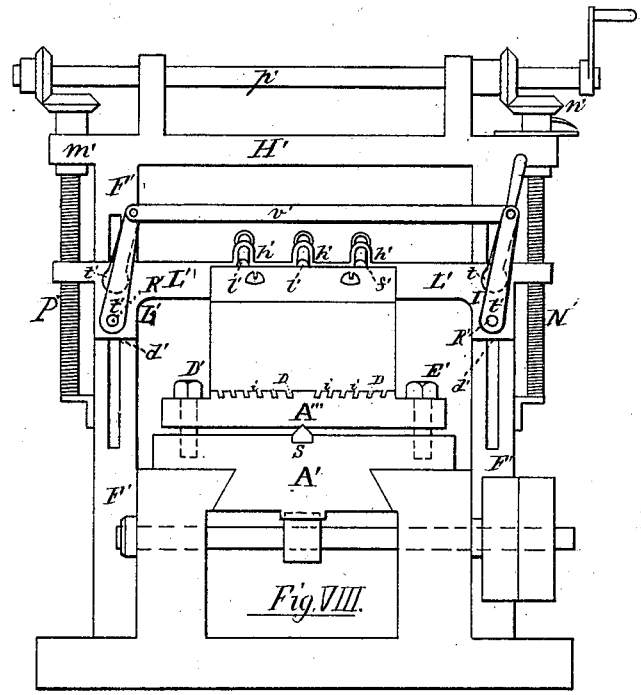
Fig. VIII.
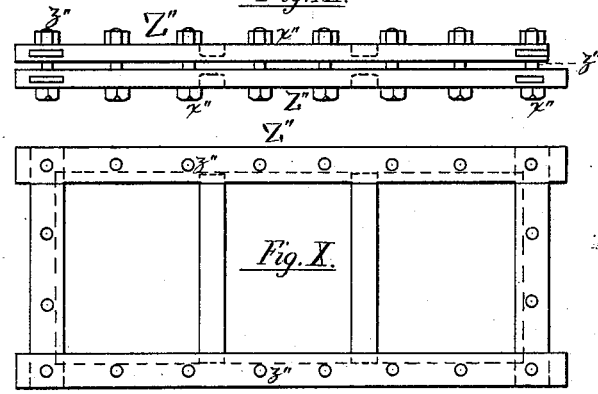
Fig. IX.
Fig. X.
Attest:
Chas. D. Gill
F. Walter Fowler
Inventor:
John W. Hyatt
by his attorneys Cox & Cox 5 Sheets—Sheet 5.
J. W. HYATT.
Manufacture of Sheets of Celluloid and other Plastic Compositions.
No. 199,908.        Patented Feb. 5, 1878.
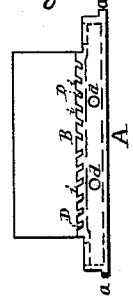
Fig. XI.
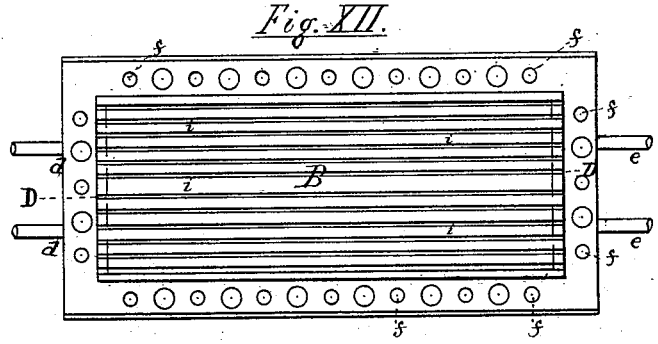
Fig. XII.
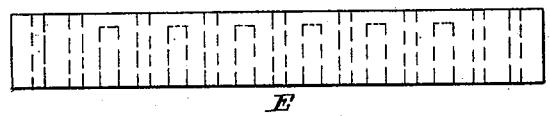
Fig. XIII.
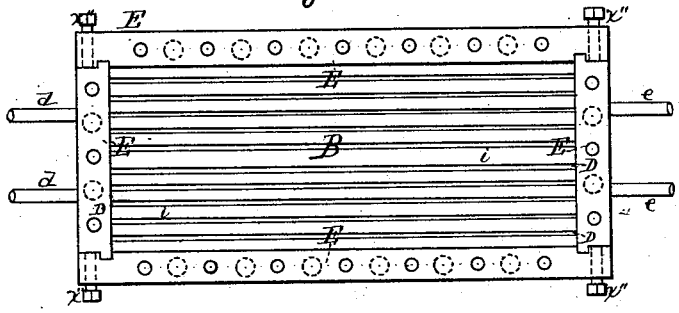
Fig. XIV.
Attest:
Chas. T. Gill
F. Walter Fowler
Inventor.
John W. Hyatt
by his attorneys Cox & Cox

UNITED STATES PATENT OFFICE.

JOHN W. HYATT, OF NEWARK, NEW JERSEY, ASSIGNOR TO THE CELLULOID MANUFACTURING COMPANY, OF SAME PLACE.

IMPROVEMENT IN THE MANUFACTURE OF SHEETS OF CELLULOID AND OTHER PLASTIC COMPOSITIONS.

Specification forming part of Letters Patent No. 199,908, dated February 5, 1878; application filed December 26, 1877.

*To all whom it may concern:*

Be it known that I, JOHN W. HYATT, of the city of Newark, in the county of Essex and State of New Jersey, have invented a new and useful Improvement in Manufacturing Sheets of Plastic Composition, of which the following is a specification, reference being had to the accompanying drawings.

The invention relates to an improved apparatus and process for the manufacture of sheets of plastic composition, and, in the present instance, is applied to the article known as "celluloid."

Heretofore the great obstacle to successfully planing or reducing plastic or pliable material to sheets by securing it upon a surface and then feeding it to a fixed cutting-edge has been that the material was apt to rise from the surface supporting it and ride up the knife, thus cutting the material irregularly or arresting the operation. Hence to hold the slab of material firmly upon the surface sustaining it pending the operation of shaving or planing it into strips, has been esteemed a great desideratum, and is one of the objects effected by the mechanism and process hereinafter set forth.

The objects of the invention are accomplished by causing the union in a single slab of a number of sheets or pieces of celluloid, this being effected by means of pressure and heat, which contemporaneously amalgamate the sheets into a slab, and also force portions of the under side thereof into channels or inclined grooves in the surface upon which the slab rests, which grooves are so arranged that upon the hardening and shrinking of the material the portions thereof in the grooves operate as a series of hooks or clutches to retain the slab in place, after which the plate supporting the slab is placed upon a machine for planing, whereby the material is shaved or planed off in sheets or pieces of any desired thickness, according to the capacity of the machine, the sheets being subsequently dried in open frames, whereby they acquire and retain formation.

Referring to the accompanying drawings, Figure 1 is a side elevation of the press, showing the platen F depressed. Fig. 2 is an end view of same, showing the platen F partially elevated and the platen T entering the space between the chases E. Fig. 3 is a plan view of the top of the press, the plate A and chases in position when the celluloid therein is being solidified, the top and platen T removed. Fig. 4 is a plan view of the plate A''' used in the manual operation. Fig. 5 is an end view of the devices used in the manual operation, the plates being partially compressed. Figs. 6, 7, 8 are views of the planing mechanism. Figs. 9 and 10 are views of the stretching-frame, the dotted lines showing the edge of a sheet of celluloid in place. Fig. 11 is an end view of the plate A with a piece of celluloid secured thereon. Fig. 12 is a plan view of the plate A. Fig. 13 is a side elevation of the chase E, the bolt-holes and cavities shown in dotted lines. Fig. 14 is a plan view of the plate A, showing the boss B surrounded by the chases E.

Unseasoned celluloid, when heated above 150° (one hundred and fifty degrees) Fahrenheit, becomes plastic, and can be easily manipulated so long as it is warm, but, becoming cool, it hardens, and while losing its caloric has a slight tendency to shrink.

In the accompanying drawings, A represents a plate having a tongue, $a$, along its edge, and nozzles $d$ and $e$, intended, respectively, to be connected, when required, with pipes supplying steam or water.

The plate A is hollow for the purpose of receiving either steam or water, as circumstances demand, and is provided near its edge with suitable bolt-holes $f$, to afford a means of securing the chases hereinafter mentioned.

The central portions of the upper surface of the plate A are occupied by a slightly-raised boss, B, the entire upper surface of which is covered by the grooves D and the intermediate ridges or elevations $i$. The grooves D upon one side of the vertical longitudinal center of the boss incline inward and downward toward the vertical central longitudinal plane of the plate A, and upon the other side of said center incline in a similar manner toward said plane.

The purpose of this construction is hereinafter set forth, and may be effected, though not so satisfactorily, by means of apertures of any desired form which have an inclination downward toward the said plane, the apertures, or certain thereof, on opposite sides of the said center of the plate having similar inclinations toward the said central plane.

The edges of the plate A about the boss B are level for the purpose of receiving the side and end chases E, which are hollow, and provided with suitable inlets and outlets for steam or other suitable means of heating, or water or other means of cooling; or they may be provided with apertures leading into their cavities, which can be placed over apertures in the plate A, and the supply of heating or cooling agent thus derived. The screws $x'''$ are provided at the end of the chases for the purpose of opening the chases after the slab has been formed. These chases are firmly secured in a vertical position and in a steam-tight manner about the boss B, forming a rectangular inclosure, open above, the walls and bottom of which can be heated or cooled, as desired.

The plate A with the chases E is placed upon the platen F of a hydraulic press, a non-conducting surface, H, preferably composed of a sheet of metal superposed upon a sheet of paper, being interposed between the lower surface of the plate A and the upper portion of the platen F. The plate A is secured upon the platen F by means of the brackets $l$, that extend over the tongues $a$ on each side of the plate. The platen rests upon two upward-acting hydraulic rams, I, operated by the hydraulic cylinders L, which are placed upon the base M of the press in such position as to sustain the platen F horizontally. The cylinders L are supplied with power through the pipes $m$, provided with the regulating-valves $n$, and are connected with the pipe $o$, provided with the supply-valve $p$, which has an exhaust-pipe controlled by the exhaust-valve $q$. Thus it is obvious that both of the rams I can be simultaneously or singly actuated, the latter operation sometimes being required when the material is more unyielding at one than at the opposite end of the boss, or when for any other reason the platen ascends unevenly.

The base M of the press is connected with the top N by means of the rods P, which are threaded upon their upper portions, and extend through the top N, above and below which they are provided with the setting-nuts $t$, which serve to sustain the top at any desired height. These rods extend through and operate as guides for the platen F, and are provided near the lower setting-nuts $t$ with the regulating-nuts R, which limit the movement of the platen and serve to start it downward, when, by reason of the creation of a vacuum in the inclosure of the chases, occasioned by the plate A being elevated until the dependent platen, hereinafter mentioned, has fully entered the said space and expelled the air therefrom, or for any other cause, the platen will not descend. The operation of returning the platen is effected simply by so turning the regulating-nuts that they will run down the thread on the rods P until they come in contact with the platen, after which the continued rotation of the nuts will force the platen loose and break the vacuum, the power of the screw being sufficient to overcome the atmospheric or other resistance. Upon the edge of the platen there may be secured a spirit-level or index of any suitable order, for the purpose of indicating any deviation of the platen F from a true horizontal, and to show the elevation of the boss B. Upon the under surface of the top of the press, and separated therefrom by a sheet of non-conducting material, is firmly secured the dependent platen T, of such dimensions as to nicely, but not in an air-tight manner, fill the inclosure between the chases E. This platen T is also made hollow, and provided with suitable means for supplying its cavity with either steam or water, or other heating or chilling agents.

For the purpose of securing the chases in place, an irregular octagonal frame, V, is constructed, which encompasses the chases, and is provided with four or more long clamp-screws, $w$, and four short ones, $x$.

This frame V operates as follows: Being brought opposite the chases, the screws $w$ are equally advanced from opposite sides against the side chases, clamping them firmly against the end chases which are within the ends of those on the sides. This operation bows the frame V and brings its ends in firm contact with the end chases, securing them in place. The clamp-screws $x$, now being advanced against the side chases adjacent to their ends, prevent them springing outward.

It is to be remarked that a series of bars of wood or other suitable material, saturated with water, can be substituted, with good results, for the chases—this when the area of the slab to be formed is smaller than the area of the boss, as in this manner the framing of chases of wood may be made of any desired contour, inclosing the material upon the boss.

The wood, of course, readily yields to the pressure, still, however, serving as a frame to contain the celluloid. Dry wood or analogous material may be used, though wet or dampened framing is preferred.

It is obvious that the above material may be solidified, or solidified and fixed upon a plate grooved as aforesaid, by means of any suitably operative pressure. To this end there is provided a hollow steam-plate, $A'''$, which is in all essential respects similar to the plate A, except that it has no tongue along the edges, and the grooves D may extend from end to end.

$D''$ is a hollow plate, provided with suitable inlets and outlets for heating and cooling agents. These plates, in operation, are connected by the bolts $d''$ and nuts $e''$, the former being placed in the slots $f'''$, coincidently situated in the edges of the plates $A'''$ and $D''$, so that the bolts can be removed or replaced as soon as the nuts are loosened.

For chases, strips E'', composed of wood or other suitable porous or fibrous material, preferably saturated with water, are employed. The saturation is for the purpose of rendering the chases E'' pliant and compressible, and also that during the operation the heated surfaces with which they come in contact may cause them to evolve steam or moist heat, which is preferable in the plastification of celluloid.

The details of the operation of this mechanism are substantially, as to application of the heating and cooling agents, the same as in that hereinafter described. The pressure is obtained simply by working down the nuts $e''$, thus contracting the space between the plates A''' and D'', and so compressing the material, the plates being heated and cooled similarly to the manner hereinafter set forth, and, being heated, their contact with the dampened chases E'' causes the said evolution of steam or moist heat.

The operation is as follows: The requisite number of sheets of celluloid are superposed, one above the other, upon the boss B, which is placed exactly below the platen T, the chases being in place, and there secured by the frame V and its clamp-screws. Hydraulic pressure is now communicated to the rams I, which elevate the platen F, plate A, chases E, and material therein, until the dependent platen T enters the space between the chases, compressing the material between its lower surface and the upper surface of the boss B, which pressure is continued until equaling two hundred and fifty (250) pounds, more or less, to the square inch, which pressure is maintained throughout the entire operation. It is plain, however, that the degree of pressure must be varied to suit the nature of the material to be affected through its action. The requisite pressure being reached, the heating agent is next admitted into the cavity in the plate A until it is properly affected. Now, as this heat is communicated from below, the lower stratum of the celluloid upon the boss is first heated and solidified, which expels the air from the bottom upward through the material, and through the spaces between the edges of the material and the faces of the chases. Meantime, under the action of the heat, the lower surface of the celluloid has become plastic, and, the pressure being continued, the parts thereof above the same are gradually forced into and completely fill the grooves D.

The pressure and heat are maintained until the air is thoroughly expelled from the material, when the heating agent is gradually introduced into the cavity in the dependent platen T, now in contact with the celluloid, which, under the operation of the heat thus being supplied, becomes plastic, and under the pressure is solidified into a single compact slab. The pressure being still sustained, the next step is to fill the plate A, chases, and platen T with water or other suitable cooling agent, which forthwith chills the celluloid, whereupon it hardens in place, any lateral shrinkage being prevented by the pressure, while the plate and platen, being placed upon non-conducting material, are not affected by the temperature of the adjacent surfaces. The chases are now removed, and the material is found in a homogeneous slab secured upon the boss B. Being exposed to the air, the celluloid shrinks somewhat, which causes the portion thereof which has been forced into the inclined grooves to operate as clutches or hooks, grasping the metal with immense power, and holding the slab firmly by a tension toward the center against any movement or force, either lateral or upward.

Thus is the prime object of the invention accomplished. It is plain, however, that pieces of scrap celluloid of other form than sheets may be placed upon the boss and compressed into a slab and similarly attached to the plate, suitable solvents, such as spirits of camphor, being mingled with the fragments to expedite the reunion and improve the result of the operation.

It is also plain that the above mechanism may be effectively used to secure various substances that become fluid or plastic under the action of heat upon a surface preparatory to further manipulation.

The apparatus next involved relates more immediately to the planing or shaving the material into sheets. This mechanism consists of a frame of any desired strength and construction, provided with a traveling bed-plate, A', held in place by brackets or other suitable means, and operated by means of a traveling screw, or any other means which will give the bed-plate A' a reciprocating movement. Usually the bed-plate operates on a true level; but it is frequently desired to cut sheets of material that shall be beveled upon one or both surfaces, and to do this it is necessary that the plate carrying the material should have a slight tilt or cant. To this end the plate A is mounted upon a strip of metal, S, centrally and longitudinally traversing the bed-plate A', and is secured thereon by the screws D' E', thus affording it a support, and permitting the plate to be slightly tilted by respectively elevating and depressing the screws on opposite sides.

When it is desired to cut a beveled sheet, the plate A is tilted by elevating the screws D', thus raising one side of the plate and holding it in an inclined position, the screws E' being correspondingly depressed. The plate is now advanced under the plane, hereinafter described, and a beveled sheet is thus shaved or planed off. The screws D' are then depressed and the screws E' elevated, the plate A being thus inclined in the opposite direction, when the operation of planing is repeated. Thus at every successive movement of the bed-plate A' a beveled sheet or shaving is produced.

It is plain that many other means of tilting the plate A will suggest themselves, the above indicating only a means of effecting the object by the interposition of a greater thickness of metal under one than the other edge of the plate A. The production of a beveled sheet may also be effected by arranging the plane upon a swivel, so that the plane may be canted or tilted. This expedient being employed, there is no occasion to have the plate carrying the material tilted.

At about two-thirds of its length the sides of the frame are carried up, forming two standards or pedestals, F', which are connected by the cross-bar H', the purpose of this construction being to sustain the cross-head, which is formed of one piece of material, and traverses the frame and bed-plate at right angles. The ends of the cross-head are formed of guide-plates I', provided with T-shaped guides $d'$, which move in vertical slots in the front edges of the pedestals F' to give the cross-head a true vertical movement, and to prevent its being detached.

The guide-plates are connected by the cross-head L', which tapers to a blunt edge, being thus inclined for the purpose of giving the plane M' secured upon it a proper angle. The rear of the plane M' is secured in a depression, $e'$, in the face of the cross-head L', being held therein by bolts, the edge of the depression serving as a support against any pressure exerted upon the plane from material being operated upon. The cross-head L' is also provided with the cavities $f'$ just above the recess that contains the plane, which cavities terminate in the bosses $h'$, through which pass the set-screws $l'$, the lower ends of which impinge the back of the plane, and by this means regulate its cut, or, being further advanced upon one than the opposite side, the screws cause the knife to stand at an angle to the vertical transverse plane of the bed-plate, and thus give a draw-cut to all matter the bed-plate may bring in contact with the cutting-edge.

The position of the guide-plates regulates the relation of the plane to the material it operates upon, and these plates are adjusted by means of screws N', which extend upward through ears $m'$ on the outer upper parts of the standards F', the lower ends of the screws resting upon ears at or near the base of the standards.

The upper part of the screw is furnished with a bevel-wheel, $n'$, which engages a like wheel on the rod $p'$ extending across the frame above the standards, and connected through a corresponding bevel-gearing with a corresponding screw, P', on the opposite side of the frame. Thus as the screw N' is rotated both the guide-plates, and, consequently, the bar, and with it the plane, are either elevated or depressed.

The cross-head is secured in place by means of the screws R', the heads of which are polygonal, and within and impinge the parts of the standards adjacent the guide-slots therein, while the outer ends of the screws are secured to the levers $t'$, which are connected by a rod, $v'$, one of the levers being extended into a handle, which, being rotated, the screws are simultaneously operated, bringing their heads in contact with the parts of the standard adjacent the vertical slots, clamping the guide-plates in place, and so securing the plane simultaneously at several points. A contrary movement frees the plates and permits the elevation or depression of the cross-head.

The gage for regulating the cut of the plane consists of a graduated disk, A'', fixed upon the screw N' above and adjacent the bevel-wheel thereon. Now, for the sake of illustration, suppose the pitch of the thread of the screw N' be one-fourth ($\frac{1}{4}$) of an inch, and the index-gage have sixteen (16) equal divisions, when the gage is turned one space that would be one-sixteenth of the circumference of the screw, and, as the pitch of the thread is one-fourth ($\frac{1}{4}$) of an inch, it is plain that the said movement would elevate or depress the screw N' one-fourth of one-sixteenth—that is, one sixty-fourth ($\frac{1}{64}$) of an inch. If the disk A'' were divided into two hundred and fifty graduations, it is plain that upon such a screw the movement of the disk one graduated space would effect the screw the one-thousandth ($\frac{1}{1000}$) of an inch—that is, one fourth of one two-hundred-and-fiftieth. Hence it is obvious that a machine thus constructed is capable of any adjustment, and consequently of producing sheets of any desired thickness. The operation of planing is effected simply by securing the plate A, carrying the slab of celluloid, upon the bed-plate A' and causing the latter to move, thereby bringing the material secured upon the plate A in contact with the edge of the plane, which is depressed as desired, according to the thickness of the sheet to be removed from the slab.

It is obvious that, after one of the slabs has been shaved off, leaving only a thin film of celluloid upon the plate, a second slab may be secured thereon by means of collodion, cement, or other suitable solvents, that will cause the slab to unite homogeneously with the film remaining upon the plate, when the slab thus attached may be manipulated the same as though secured upon the plate in the manner first above detailed.

The sheet of celluloid is now placed in the frame Z'' so that its edges are between the two sections X'' thereof, which are clamped together by means of the bolts $z''$ and nuts $x''$, holding the material securely within the frame, where it is permitted to dry, during which operation it shrinks slightly, which draws it taut and straight across the frame, so that it hardens into a flat, smooth sheet, after which it may be removed from the frame, being now finished.

The plate A may be grooved laterally or otherwise, and bars of wood secured in the grooves so as to be flush with, or slightly above, the surface of the plate, and the slab formed upon this formation.

The purpose of retaining the slab in position may be effected also by vertical apertures in the plate, or, in fact, apertures or elevations of any order in or upon or about which the plastic composition can be forced, and there permitted to harden, the essence of this element of the invention being to affix a plate of plastic composition upon a plate immovably by combined heat and pressure and subsequent cooling.

Obviously the plate A may be utilized, even if it be solid and not hollow, since the material may be made plastic before being put thereon, when it can be crowded into the grooves; or it may be crowded therein by great pressure.

What 1 claim as my invention, and desire to secure by Letters Patent, is—

1. A slab of material secured upon a surface through the operation of the power it exerts in shrinking, acting upon two or more elevations or depressions on or in the surface on which the slab is placed, substantially as set forth.

2. A plate for retaining plastic composition in place, provided with grooves or apertures, the planes of which would intersect if extended.

3. A plate for retaining plastic composition in place, provided on its upper surface with apertures or indentations, upon which the material in shrinking can exert tension, substantially as set forth.

4. A plate for retaining plastic composition, provided with apertures or grooves inclining toward the longitudinal central plane of the plate, substantially as set forth.

5. The plate A, provided with the grooves D, substantially as specified, and for the purpose set forth.

6. A hollow plate or table provided with means of receiving a heating and a cooling agent, and having its surface grooved, indented, or corrugated, substantially as set forth, and for the purpose specified.

7. The plate A, provided with the boss B, substantially as specified, and for the purpose set forth.

8. A plate having a surface grooved or indented and surrounded by a level edge, substantially as expressed, and for the purpose specified.

9. The combination of a series of vertical hollow walls upon a horizontal hollow plate having elevations or depressions, the walls and plate being attached in a steam-tight manner, as set forth, and for the purpose specified.

10. The chase E, for the purpose specified.

11. The chases E, in combination with the plate A, substantially as expressed.

12. The hydraulic cylinders L, provided with the pipes $m$, having the regulating-valves $n$ and connected by the pipe $o$, provided with a supply-pipe and exhaust-valve, substantially as set forth.

13. The regulating-nuts R, for the purpose set forth.

14. The dependent hollow platen T, provided with means of receiving a heating or cooling agent, and placed upon a non-conducting surface, substantially as set forth.

15. The frame V and clamp-screws $w$ and $x$, for the purpose specified.

16. The frame V and clamp-screws $w$ and $x$, in combination with the chases E, substantially as set forth.

17. The plate $A'''$, in combination with the chases $E''$, for the purpose specified.

18. The plate $A'''$ and chases $E''$, in combination with the plate $D''$, substantially as set forth.

19. A strip or chase composed of fibrous or porous material saturated with water, for the purpose specified.

20. The process of solidifying pieces of composition, which consists in subjecting them to pressure, then heating the mass from below, then applying heat above, the pressure being sustained pending the heating operations, as and for the purpose specified.

21. The process of solidifying pieces of composition, which consists in subjecting them to pressure, then heating the mass from below, then heating it from above, then cooling it while still under pressure, substantially as set forth.

22. A receptacle the base and walls of which are capable of separate or conjoint heating or cooling, in combination with a platen capable of being heated or cooled, as set forth.

23. The process of simultaneously consolidating several pieces of composition and affixing the slab thus formed to a plate, which consists in rendering it plastic while under pressure, whereby a portion of it is forced into suitably-shaped apertures in the plate, which portion is hardened while therein, substantially as specified.

24. A plate carrying an immovably-fixed slab of composition, and capable of being tilted, as substantially set forth, and for the purpose specified.

25. The screws $R'$, in combination with the levers $t'$ $t'$ and rod $v'$, substantially as set forth.

26. A slab of plastic composition secured upon a plate by means of cement, or its equivalent, that causes it to homogeneously unite with a portion of the same or analogous composition fixed immovably upon the plate, substantially as set forth.

27. The frame $Z''$, composed of two sections united by bolts, for the purpose of drying a sheet of plastic composition, substantially as set forth.

28. The within-described process of making sheets of plastic composition, which consists, first, in forming and causing the adhesion of a slab of the composition to a plate; second, subjecting such slab to the operation of a plane to reduce it to sheets; and, third, drying the sheets thus produced in a frame, substantially as set forth.

29. A plate for retaining plastic composition provided with two or more apertures to receive or projections to hold the slab when hardened therein or thereon, whether the plate be hollow or solid, substantially as set forth.

30. A slab of plastic composition fixed upon a bed or plate by the means substantially as herein specified, for the purpose of enabling the division or planing of the slab, substantially as set forth.

31. A plate carrying a slab of plastic composition affixed thereon by means of heat and pressure, substantially as set forth, and for the purpose specified.

In testimony that I claim the foregoing improvement in manufacturing sheets of plastic composition, as above described, I have hereunto set my hand this 13th day of December, 1877.

JOHN W. HYATT.

Witnesses:
ABRAHAM MANNERS,
HARRY COX.